No. 736,807. PATENTED AUG. 18, 1903.
C. A. WILKINSON.
INTERNAL COMBUSTION ENGINE.
APPLICATION FILED NOV. 14, 1901.
NO MODEL. 3 SHEETS—SHEET 1.
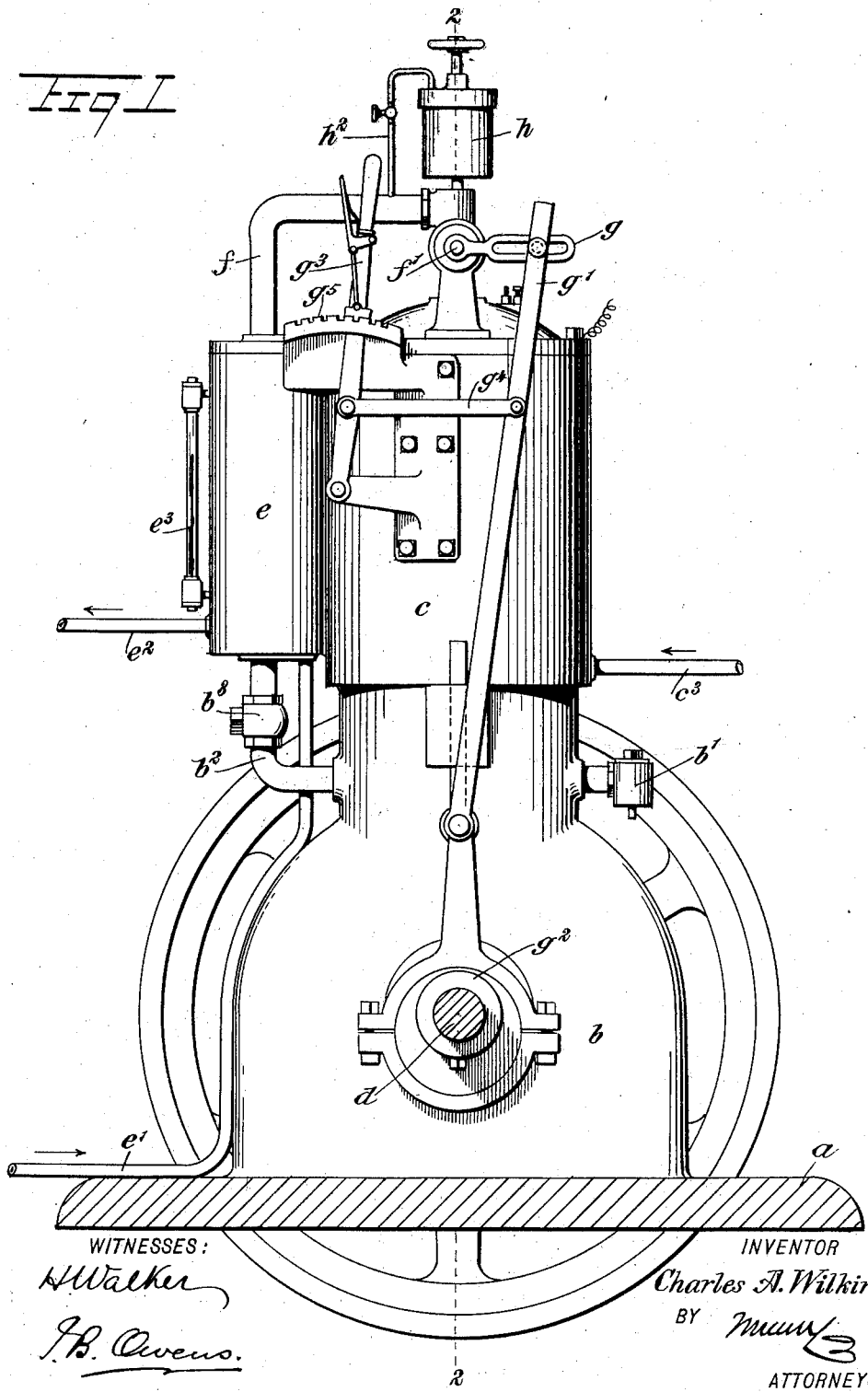
WITNESSES:
H. Walker
J. B. Owens.
INVENTOR
Charles A. Wilkinson
BY
ATTORNEYS

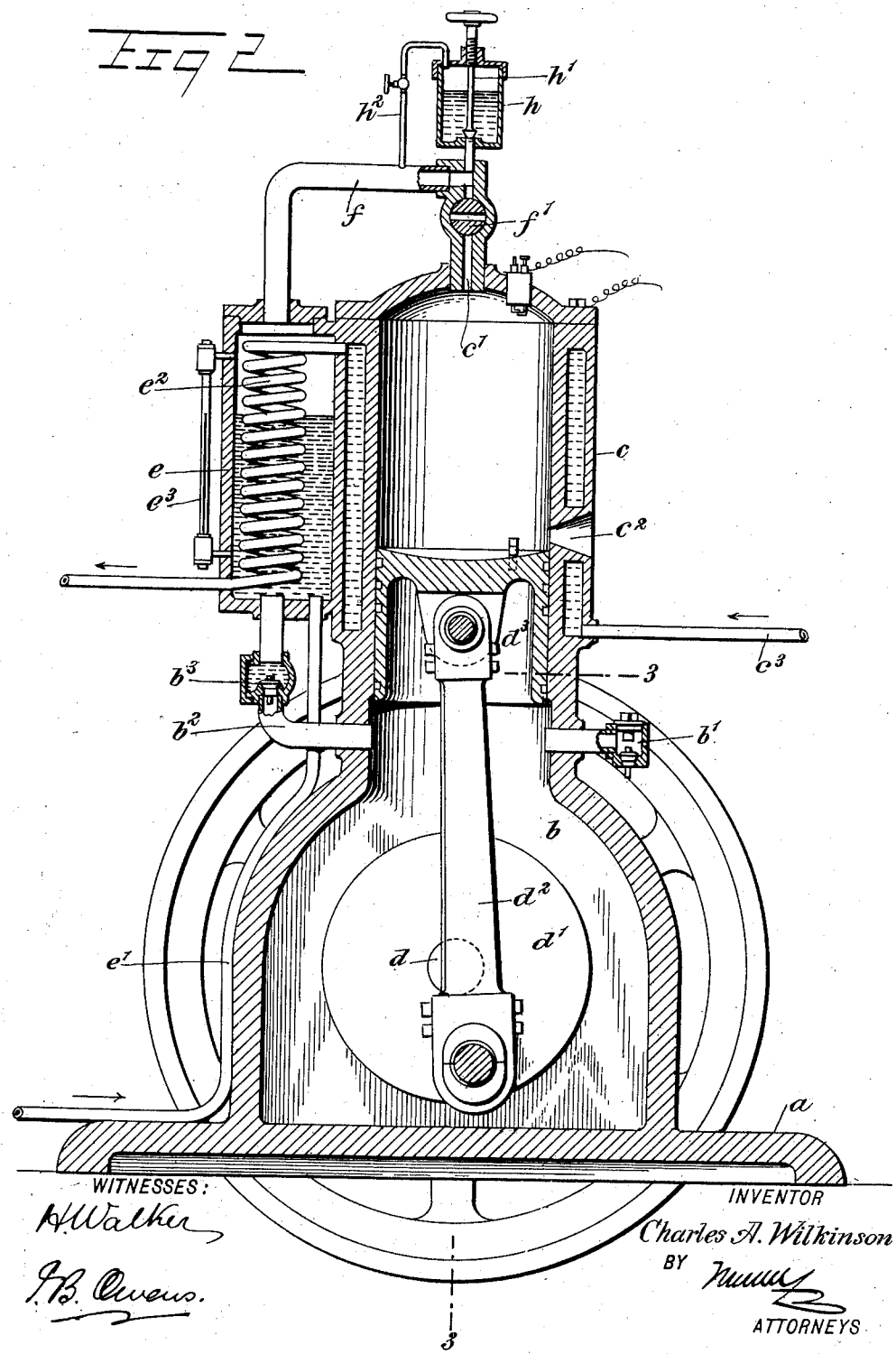

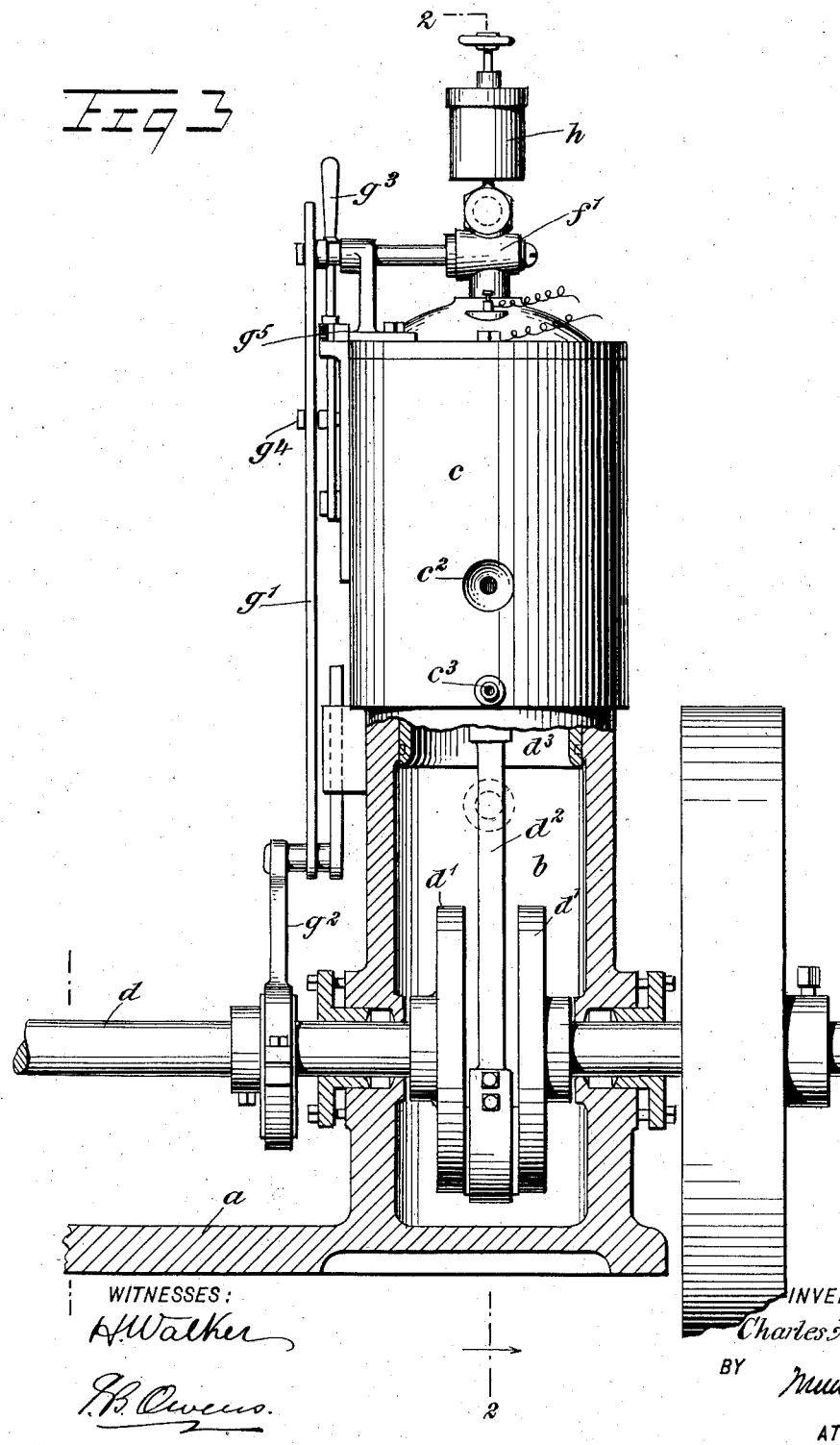

No. 736,807. Patented August 18, 1903.

UNITED STATES PATENT OFFICE.

CHARLES A. WILKINSON, OF WORCESTER, MASSACHUSETTS.

INTERNAL-COMBUSTION ENGINE.

SPECIFICATION forming part of Letters Patent No. 736,807, dated August 18, 1903.

Application filed November 14, 1901. Serial No. 82,315. (No model.)

*To all whom it may concern:*

Be it known that I, CHARLES A. WILKINSON, a citizen of the United States, and a resident of Worcester, in the county of Worcester and State of Massachusetts, have invented a new and Improved Internal-Combustion Engine, of which the following is a full, clear, and exact description.

This invention relates to an internal-combustion engine in which a relatively heavy or non-volatile oil may be used for fuel, this oil being heated from the cylinder of the engine and a current of air under pressure being ejected through it, so as to carburet the air, which is then passed into the cylinder to be compressed and exploded.

The invention involves various novel features of construction and arrangement, which will be fully described hereinafter.
This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a side elevation of the invention. Fig. 2 is a section on the line 2 2 of Fig. 1, and Fig. 3 is an end elevation with parts in section on the line 3 3 of Fig. 2.

$a$ indicates the base of the engine-frame.

$b$ indicates the crank-case, and $c$ indicates the cylinder, having a feed-port $c'$ in its head and the exhaust-port $c^2$ at the limit of the outstroke of the piston.

$d$ indicates the engine-shaft.

$d'$ indicates the crank-disks, $d^2$ the piston-rod, and $d^3$ the piston.

An igniter of any form may be used—for example, that shown in my copending application, Serial No. 78,728, filed October 15, 1901.

The crank-case $b$ is closed, so that the outward movement of the piston will press air therein, this air being admitted through a valve $b'$.

$b^2$ indicates a pipe leading the air from the crank-case $b$, this pipe being controlled by a check-valve $b^3$. The pipe $b^2$ leads to a reservoir $e$, carried on the outside of the cylinder and adapted to have the oil fuel fed thereto by a pipe $e'$. The cylinder is water-jacketed, as shown, the water entering by a pipe $c^3$ and passing from the jacket into a coil $e^2$ in the reservoir $e$, so as to thoroughly heat the oil in this reservoir.

$e^3$ indicates a gage to show the elevation of the oil in the reservoir. Now it will be seen that as the air is compressed in the crank-case $b$ and ejected therefrom through the pipe $b^2$ it will pass through the mass of oil in the reservoir $e$ and be carbureted, so that when it arrives in the top of the reservoir it will be in the form of a combustible gas. By utilizing the heat of the cylinder or, specifically, the heat of the water in the jacket for heating the oil I increase the efficiency of the engine without increasing the expense of operation, since this heat of the cylinder otherwise would be wasted.

From the upper part of the reservoir $e$ leads a pipe $f$, which carries the vapor to the feed-port $c'$ of the cylinder.

$f'$ indicates an oscillating valve working in the pipe $f$ to control the charge. This valve $f'$ is operated by devices shown in Figs. 1 and 3—namely, a slotted arm $g$, joined by a connecting-rod $g'$ with an eccentric $g^2$ on the engine-shaft $d$. The connecting-rod $g'$ is adjustably attached to the arm $g$, so that the throw of the arm may be varied, and the connecting-rod is thus adjusted by means of a lever $g^3$ and link $g^4$, the lever working with a toothed quadrant $g^5$, as will be readily understood. Since the oil is heated before it is carried to the cylinder, relatively heavy oils may be used—thus, for example, crude petroleum—thus decreasing the cost of running the engine; but to start the engine it would be difficult to produce the initial explosion from this oil, and for this purpose I may provide, if desired, a small reservoir $h$, arranged just over the valve $f'$ and in communication therewith. This reservoir has a hand-operated valve $h'$, controlling its communication with the feed-port of the engine, and a pipe $h^2$ leads from the pipe $f$ to the top of the reservoir $h$, so that the pressure of the pipe $f$ may be communicated to the reservoir $h$. This reservoir may be filled with naphtha or other more volatile oil, and in starting the engine the valve in the pipe $h^2$ may be opened and the valve $h'$ opened, so that a thin stream of naphtha will meet the partly carbureted air from the pipe $f$. This will produce a mixture which may be readily exploded, and thus the engine may be started. As soon as heat is developed in the cylinder sufficiently to heat the reservoir $e$ the pipe $h^2$ and the valve $h'$ may be closed and the operation of the engine gone on with irrespective of these parts.

The manner in which the engine operates will be apparent to all persons skilled in the art and will not require any special description.

Having thus described my invention, I claim as new and desire to secure by Letters Patent—

1. An internal-combustion engine, having a reservoir for liquid fuel adjacent to the cylinder, means for heating said reservoir from the engine-cylinder, a pipe leading from the reservoir to the cylinder feed-port, means for forcing air through the reservoir and pipe into the cylinder, an oscillating valve in the pipe leading to the cylinder and controlling the charge, means for oscillating said valve, mechanism for adjusting the operating means to regulate the movement of the valve, and a locking device for said mechanism.

2. An internal-combustion engine, comprising a jacketed cylinder having a feed-port in its head, a liquid-fuel reservoir attached to the cylinder, a pipe running from the jacket into and through said reservoir to heat the liquid, a closed crank-case in which air is pressed by the outward movement of the piston, a valve for admitting air to said crank-case, a valve-controlled connection between said crank-case and the lower part of said reservoir to admit air under pressure to the reservoir, a pipe for conducting the combustible gas and leading from the upper part of said reservoir to the feed-port of the cylinder, a valve in said pipe for controlling the charge, means for operating said valve, and mechanism for adjusting the operating means to regulate the movement of said valve.

3. An internal-combustion engine having a reservoir adapted to contain an oil fuel, a pipe leading from the reservoir to the cylinder feed-port, means for forcing air through the reservoir and said pipe into the cylinder, an additional or auxiliary reservoir communicating with the cylinder feed-port and adapted to contain an oil more volatile than that in the main reservoir, and a valve-controlled pipe connected with the pipe leading from the main reservoir and leading to the auxiliary reservoir.

4. An internal-combustion engine, having a reservoir heated from the heat of the engine-cylinder and adapted to contain an oil fuel, a pipe leading from the reservoir to the cylinder feed-port and provided with a valve for controlling the charge, means for forcing air through the reservoir and said pipe into the cylinder, an additional or auxiliary reservoir communicating with said pipe above the said valve and adapted to contain an oil more volatile than that in the main reservoir, a valve in said auxiliary reservoir controlling the said communication, and a pipe leading from the first-mentioned pipe and opening into the top of the said auxiliary reservoir.

5. An internal-combustion engine, comprising a jacketed cylinder having a feed-port in its head, a reservoir adapted to contain oil, a pipe leading from the upper part of the reservoir to the feed-port of the cylinder, an oscillating valve in said pipe and controlling the charge, means for forcing air through the reservoir and pipe into said cylinder, a coiled pipe arranged in the reservoir and connected with the water-jacket of the cylinder to heat the oil in the reservoir, an auxiliary reservoir located above the upper end of the cylinder and adapted to contain an oil more volatile than that in the main reservoir, the said auxiliary reservoir having an outlet in its bottom communicating with the pipe leading to the feed-port at a point above said oscillating valve, a hand-operated valve controlling the outlet from said auxiliary reservoir, and a pipe connected with the pipe leading from the reservoir and opening into the top of the auxiliary reservoir, for the purpose set forth.

In testimony whereof I have signed my name to this specification in the presence of two subscribing witnesses.

CHARLES A. WILKINSON.

Witnesses:
 CHARLES E. MCINTIRE,
 G. HERBERT MARSH.